Sept. 17, 1963  J. A. CHASE  3,103,738
METHOD OF ASSEMBLING A HEATER MOUNT
Filed Sept. 30, 1959  5 Sheets-Sheet 1
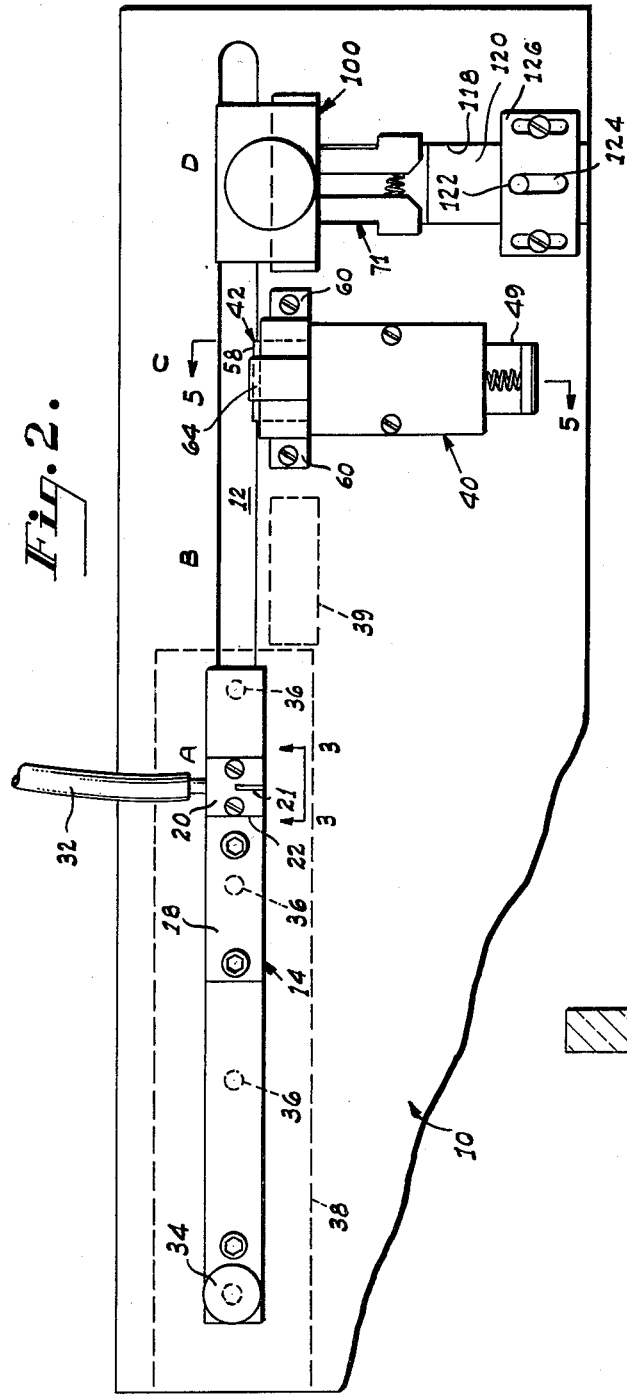
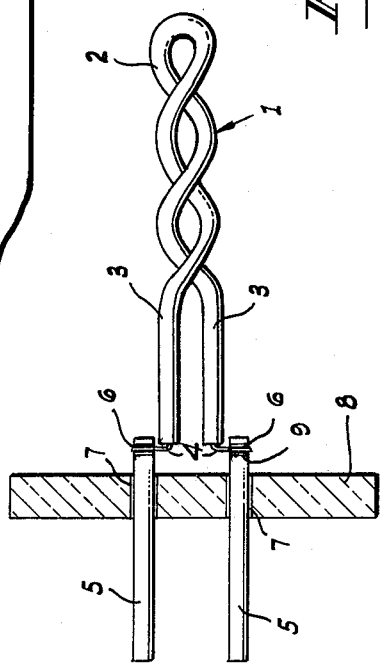
INVENTOR.
JOHN A. CHASE
BY Thomas R. Webb
AGENT Sept. 17, 1963 J. A. CHASE 3,103,738
METHOD OF ASSEMBLING A HEATER MOUNT
Filed Sept. 30, 1959 5 Sheets-Sheet 2

INVENTOR.
JOHN A. CHASE
BY *Thomas R. Webb*
AGENT

Sept. 17, 1963         J. A. CHASE         3,103,738
METHOD OF ASSEMBLING A HEATER MOUNT
Filed Sept. 30, 1959         5 Sheets-Sheet 3
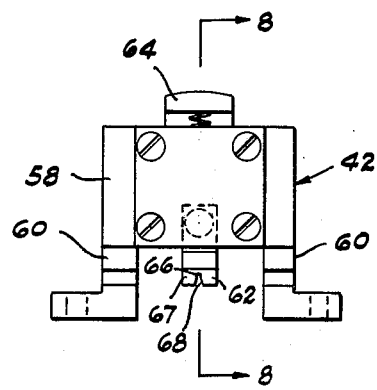
*Fig. 7.*
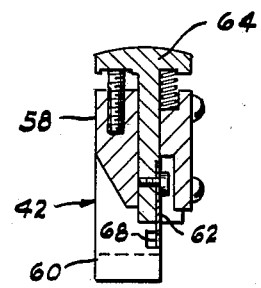
*Fig. 8.*
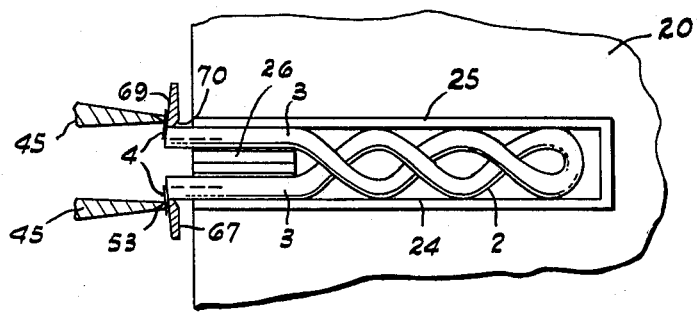
*Fig. 9.*
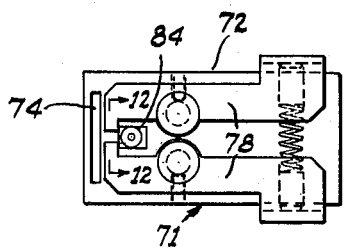
*Fig. 10.*
*Fig. 11.*
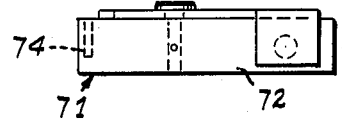
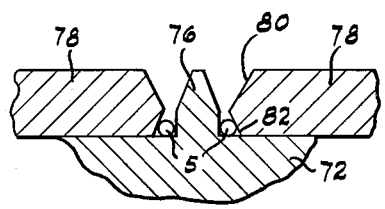
*Fig. 12.*
INVENTOR.
JOHN A. CHASE
BY
Thomas R. Webb
AGENT

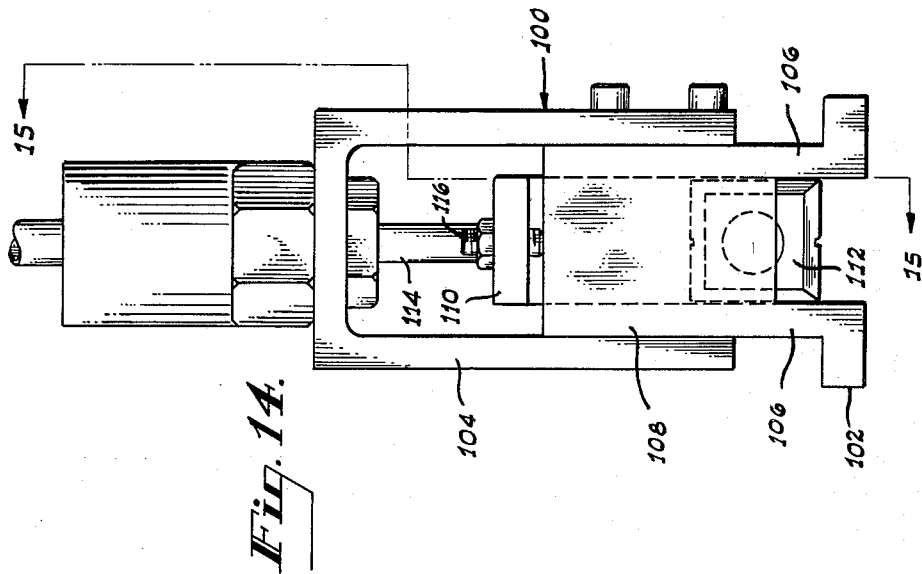
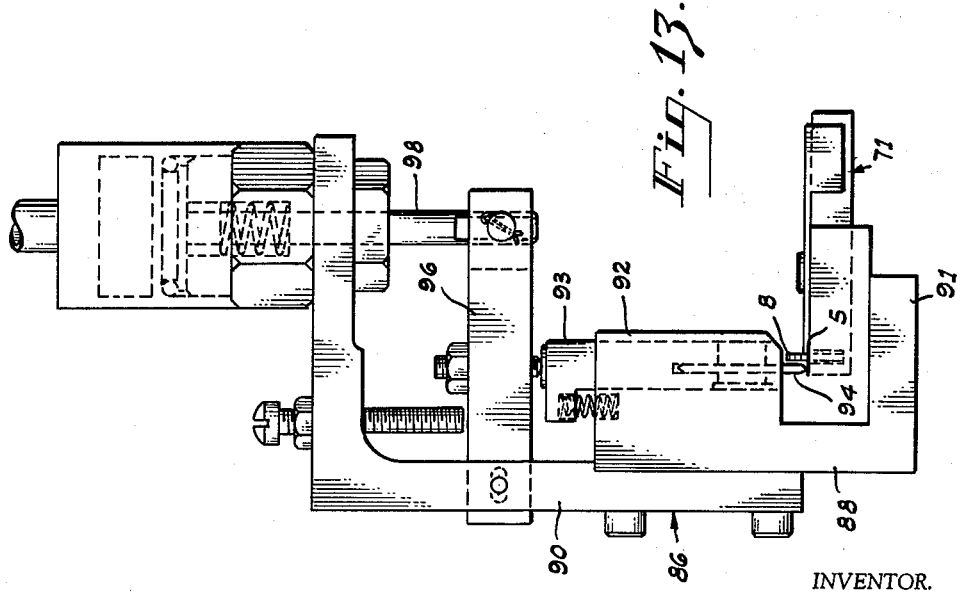

United States Patent Office 3,103,738
Patented Sept. 17, 1963

3,103,738
METHOD OF ASSEMBLING A HEATER MOUNT
John Anthony Chase, Nutley, N.J., assignor to Radio Corporation of America, a corporation of Delaware
Filed Sept. 30, 1959, Ser. No. 843,516
4 Claims. (Cl. 29—155.55)

The present invention relates to heater mounts for electron tubes, and particularly to the manufacture of heater mounts for electron tubes of very small size.

Cathode heaters used in electron tubes are usually fastened to stem lead wires by spot welding. The heaters are usually made of tungsten or similar metal having a high temperature melting point, while the lead wires are usually made of a metal, such as nickel having a much lower melting point. In some tubes, such as those having ceramic base members, it is desirable to use a high melting point metal, such as molybdenum, for the lead wires. In this case, it is difficult to make a satisfactory weld between the tungsten heater wires and the molybdenum lead wires, because the molybdenum tends to evaporate as a gas at the welding temperature. Such welded joints are subject to open or noisy electrical connections, non-rigid joints, etc. Even if the weld itself is good, the heater mount is subject to hot spots in cases of unequal spacing of the heater insulation from the weld regions. Moreover, in the new types of electron tubes of very small size, it is difficult to hold and maintain the small parts in the desired precise relationships during the welding operation.

The object of the present invention is to provide new and improved method of making heater mounts for electron tubes.

In accordance with the invention, a pair of lead wires are extended through two holes in an insulating base member, the lead wires are provided with transverse notches, the end portions of the two legs of a heater element are trimmed and then simultaneously scraped and bent to form transverse leg portions, the latter are positioned within the lead wire notches, and the notched regions are swaged or peened to close the notches over the leg portions and mechanically interlock the heater legs and the lead wires. Preferably, the lead wires extend loosely through the holes in the base member so that, after the peening operation, the lead wires can be moved to a desired position in which position the lead wires may be fixed to the base member, as by metallic brazes.

In the drawing.

FIG. 1 is a view, partly in section, of a completed heater mount made according to the invention.

FIG. 2 is a plan view of an experimental apparatus used in making the heater mount of FIG. 1 in accordance with the invention.

FIG. 7 is a front elevation view of the leg-forming back-up tool.

FIG. 8 is a section view taken on the line 8—8 of FIG. 7.

FIG. 9 is an enlarged detail view, partly in section, showing the bending and scraping operation.

FIG. 10 is a plan view of the lead wire-wafer holder.

FIG. 11 is a side view of the holder of FIG. 10.

FIG. 12 is an enlarged section view taken on the line 12—12 of FIG. 10.

FIG. 13 is a side view of the assembled lead wire notching tool and loaded lead wire-wafer holder.

FIG. 14 is a front elevation view of the swaging tool.

Figure 3:
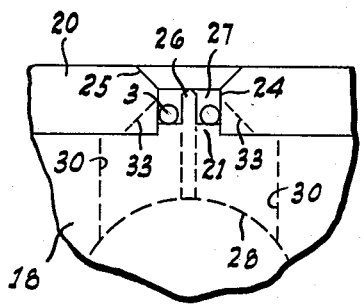
FIG. 3 is an enlarged fragmentary side view taken at 3—3 in FIG. 2.
Figure 4:
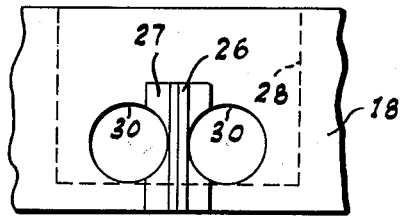
FIG. 4 is a plan view of FIG. 3 with the heater nest plate removed.

As shown in FIG. 1, the heater mount made according to the invention includes a cathode heater 1 comprising a double helical heating portion 2 and two parallel legs 3. A predetermined portion 4 of the end of each leg has been scraped to remove the insulation and bent transversely at a right angle. The transverse portions 4 have been fixed to a pair of lead wires 5 by being placed in notches 6 and the notches have been closed by a peening action. The lead wires 5 extend through apertures 7 in an insulating base member or wafer 8. Preferably, the wires are slidable in the apertures 7, so that the peened regions 9 can be moved toward the wafer 8 to minimize the spacing between the heater 1 and the wafer 8. It is necessary to space the ends of the lead wires 5 initially from the wafer 8 by at least a sixteenth of an inch, to provide room for the notching and swaging operations.

As an example only, the heater 1 may consist of a tungsten wire of 1.5 mils diameter insulated with Alundum having an outside diameter of 10 to 16 mils. The lead wires 5 may be molybdenum with a diameter of 16 mils and a length of .270 inch. The wafer 8 may be of high alumina ceramic with a diameter of .400 inch and thickness of .060 inch. The diameter of the apertures 7 may be 17–18 mils, positioned at 120° intervals on a pin circle of .070 inch diameter.

FIGS. 2 to 15 show an experimental apparatus that was used to carry out a pilot production of heater mounts in accordance with the invention.

As shown in FIG. 2, the apparatus comprises a rectangular base plate 10 having an elongated guide slot 12 extending lengthwise thereof. Mounted for sliding movement in slot 12 is a flanged slide 14 having a retainer plate 16 (see FIG. 5). A heater holding plate 18 is attached to the slide 14 at one end thereof. A U-shaped heater nest plate 20 providing a heater recess or nest 21 is mounted in a shallow recess 22 in plate 18. As shown in FIGS. 3 and 9 the upper edges of the inner walls 24 of the nest plate 20 are chamfered at 45° as shown at 25 and the adjacent portion of the plate 18 is formed with a V-shaped rib 26 to guide the heater legs 3 into position in channels 27 formed between the rib 26 and the inner walls 24 of the nest plate 20. The plate 18 is formed with a horizontal bore 28 and two vertical bores 30 opening into the heater channels 27. The bore 28 is connected by a tubing 32 to a vacuum pump (not shown) to produce a partial vacuum under the heater legs to positively hold the heater in position during the assembly operations. The side walls 24 of plate 20 are cut away at 33 above the two bores 30 so that the vacuum will hold the heater legs 3 against the side walls 24. The depth of the recess or nest 21 formed by the legs of the U-shaped plate 20 is such that when the heater 1 abuts the closed end the legs 3 protrude about $\frac{1}{16}$ inch from the nest 21.

The slide 14 is slidable from the loading position A shown in FIG. 2 to three other positions, namely, a trimming position B, a leg-forming position C and a swaging position D. In order to hold the slide 14 in each of positions B, C and D, a spring-loaded pin 34 is mounted through the left end of the slide 14 for successive positioning in each of three appropriately positioned holes 36 in an indexing plate 38 fixed to the underside of base plate 10 (see FIG. 5).

Figure 5:
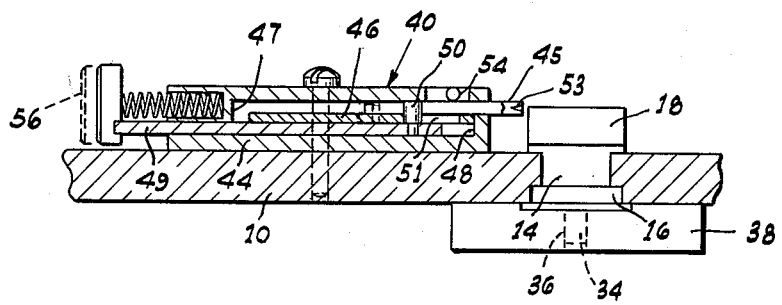
FIG. 5 is a section view of the leg-forming tool and base plate, taken on the line 5—5 of FIG. 2, with the back-up tool omitted.
Figure 6:
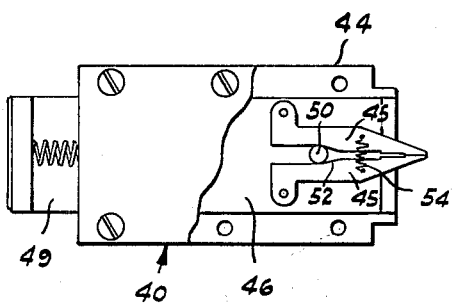
FIG. 6 is a plan view of the leg-forming tool.

After loading a heater 1 into the heater nest plate 20 at position A, the slide 14 is moved to position B at which the protruding ends of the legs 3 are cut to a predetermined length by a conventional trimming tool, schematically shown at 39 in FIG. 2. Then the slide 14 is moved to position C, at which a leg-forming tool 40 and a leg-forming back-up tool 42 are mounted on the base plate 10. As shown in FIGS. 5 and 6, the leg-forming tool comprises a rectangular body 44 in which two L-shaped leg-forming jaws 45 are pivotally mounted at one end thereof on a jaw slide 46 that is movable lengthwise of the body 44 a distance of about ⅛ inch between internal shoulders 47 and 48. The jaw slide 46 rests on an operating slide 49 having a pin 50 which extends upwardly through a slot 51 in the jaw slide 46 and between the jaws 45. The jaws 45 are formed with inclined cam surfaces 52 for engagement by the pin 50 to spread the jaws apart. The free ends of the jaws 45 are tapered and protrude from the body 44 as shown. A V-groove 53 is formed on the outside of each of the tapered ends of the jaws 45 for centering the heater legs. The jaws 45 are biased together by a tension spring 54.

The jaw slide 46 is shown in FIGS. 5 and 6 in its advanced position with the slide 46 abutting the shoulder 48. To reach this position, the operating slide 49 is advanced about ⅛ inch from its fully retracted position, shown dotted at 56 carrying the jaw slide with it. Further advancement of the operating slide 49 causes the pin 50 to spread the free ends of the jaws 45, as shown in FIG. 9.

As shown in FIGS. 2, 7 and 8, the back-up tool 42 comprises a body portion 58 having legs 60 between which the end of the leg-forming tool 40 is mounted. A back-up tool member 62 is attached to the lower end of a spring-loaded vertical slide 64 mounted in the body portion 58. The member 62 is formed with a vertical slot 66, having a width equal to that of the recess 21 in the nest plate 20, forming parallel legs 67 to engage the outer surfaces of the heater legs 3, and a tapered entrance portion 68 to guide the heater legs into the slot. As shown in FIG. 9, the faces 69 of the legs 67 facing the jaws 45 are sloped outwardly and backwardly to permit bending of the legs 3 greater than a right angle.

The slide 14 is moved to position C while the operating slides of the leg-forming tool 40 and back-up tool 42 are retracted to clear the heater legs. Then the slide 64 of the back-up tool is lowered to position the legs 67 of the member 62 on each side of the protuding heater legs as shown in FIG. 9. Then the operating slide 49 is advanced, first moving the jaws 45 into the space between the heater legs 3, and then causing the pin 50 to spread the jaws 45 to the position shown in FIG. 9. During the second phase of this operation, the notched ends of jaws 45 simultaneously scrape the insulation from the protruding ends of the heater legs and bend the bare ends outwardly to form the transverse portions 4 while the back-up member 62 rigidly supports the heater legs beyond the bent regions. The rear edges of the legs 67 may be cut away, as shown at 70, to engage only a limited region of the heater legs. The jaws 45 are pivoted to the slide 46 at points spaced apart a distance greater than the spacing between the legs 67 of the back-up tool 42 so that when the jaws are spread apart the free ends thereof move forward as well as outward, in a circular arc. Thus, the leg portions 4 are bent by the jaws 45 slightly more than a right angle, as permitted by the sloping faces 69. Then, as the jaws 45 are retracted the leg portions 4 spring back to substantially a right angle bend.

After the leg portions 4 have been formed, as described above, the operating slide 49 is retracted, first carrying the jaws 45 and slide 46 to their retracted position, and then moving the pin 50 along the cam surfaces 52, thus permitting the spring 54 to bring the jaws 45 together. Then the leg-forming slide 64 is retracted.

The leg-forming operation described above produces uniform bending at right angles but also leaves equal lengths of insulation on the legs, thus avoiding hot spots during subsequent operation in a tube.

FIGS. 10 to 12 show a holder 71 for holding the assembly of an insulating wafer 8 and two lead wires 5 during the notching and swaging operations to be described. The holder 71 comprises a block 72 having a recess 74 near one end, for receiving the wafer 8, and a tapered vertical rib 76 adjacent to recess 74, for locating the lead wires 5. Pivotally mounted on the top of the block 72 are two spring-loaded clamp levers 78. As shown in FIG. 12, the ends of the levers 78 are formed with inclined guiding surfaces 80 and clamping surfaces 82. An adjustable stop 84 is mounted on the block 72 for accurately positioning the protruding end of the lead wires 5.

FIG. 13 shows the lead wire-wafer holder 71 mounted in a lead wire notching tool 86. This tool comprises two supporting members 88 and 90 bolted together. The member 88 includes a lower holder supporting leg portion 91 and an upper portion 92 in which a spring-loaded notching slide 93 carrying a notching roller 94 is vertically mounted. The notching slide 93 is actuated by a lever 96 pivoted at one end to the member 90 and pivoted at the other end to an air-operated plunger 98 slidably mounted on the member 90. The notching roller 94 has a V-shaped cross-section at its periphery with a rounded edge of small curvature. The tool is adjusted to make a notch 6 near the tip of each lead wire, with a depth of about one-third the wire diameter.

Figure 15:
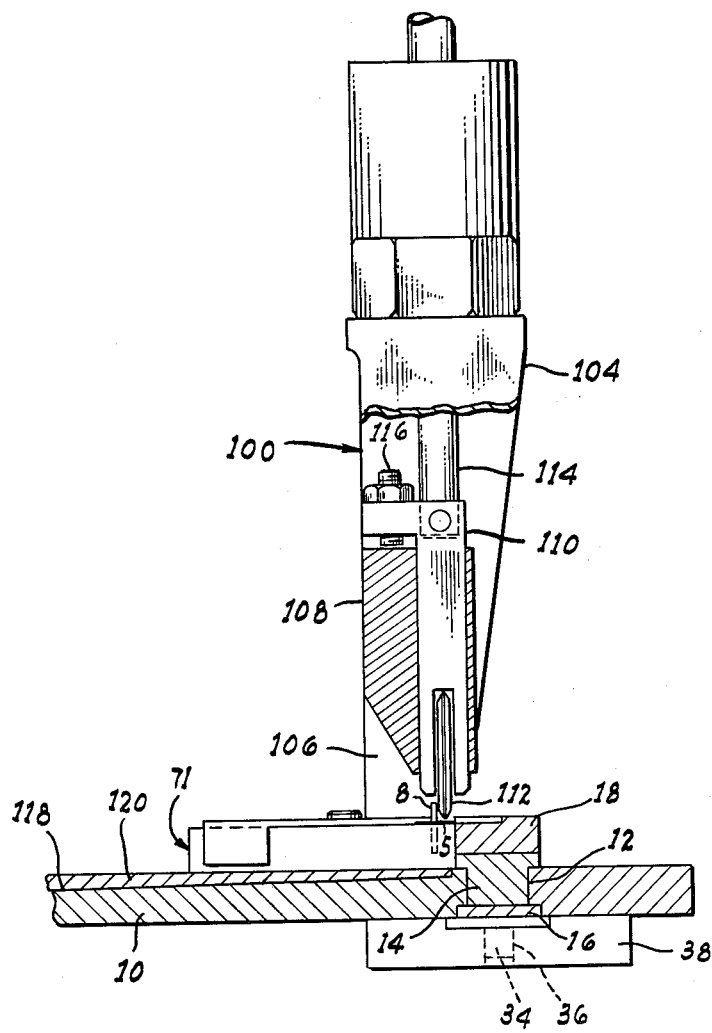
FIG. 15 is a section view taken along the line 15—15 of FIG. 14 with the tool and the lead wire-wafer holder mounted as shown in FIG. 2.

After the lead wires 5 have been notched, the holder 71 is transferred to a swaging tool 100 at position D, as shown in FIGS. 2, 14 and 15. The swaging tool 100 comprises two support members 102 and 104 bolted together. The member 102 includes a pair of support legs 106 and a cross portion 108 in which a swaging tool slide 110 is vertically mounted. The tool slide 110 carries a swaging blade 112 having a relatively blunt edge, which may be either curved or flat. The thickness of the edge is somewhat greater than the width of the notches 6 in the lead wires 5. The edge of the blade is formed with a clearance notch having a width approximately equal to the width of the recess in the heater nest plate 20. The tool slide 110 is operated by an air-operated plunger 114 slidably mounted on the support member 104. The downward movement of the slide 110 and blade 112 is limited by an adjustable stop 116.

As shown in FIGS. 2 and 15, the base plate 10 is formed with a transverse groove or channel 118 in which a support slide 120 is mounted for movement at right angles to the slot 12. The slide 120 is provided with a pin 122 which serves as a handle and also cooperates with a slot 124 in a retaining plate 126 adjustably mounted on the base plate 10 to limit the movement of the slide. The thickness of the slide 120 is tapered at an angle of about 3°, from ¹⁄₁₆ inch at the end nearest the slot 12 to ¼ inch at the other end, and the base of the channel 118 is oppositely sloped, so that inward movement of the slide raises the upper surface thereof about 30 mils.

The holder 71, with the wafer 8 and notched lead wires 5, is placed between the legs 106 of the swaging tool and on the slide 120 with the latter retracted. In this position of the slide, the lead wires lie just below and hence clear the transverse ends 4 of the heater legs 3 as the holder 71 is slid into place. Then the slide 120 is advanced to the position shown in FIG. 15, to raise the holder 71 until the transverse ends 4 of the heater legs are disposed within the notches 6, ready for the swaging operation by the swaging tool 100. The travel of the tool slide 110 is adjusted by the stop 116 to allow the swaging blade 112 to peen the side walls of the notches 6 sufficiently to mechanically interlock the heater legs 3 and the lead wires 5, to complete the heater mount as shown in FIG. 1.

All of the working surfaces of the apparatus shown in FIGS. 2–15 are made of a suitable hard metal, such as hardened steel or tungsten carbide. A roller is used instead of a fixed tool for the notching operation to provide multiple alternate working surfaces.

The apparatus described herein is designed to make the heater mount shown in FIG. 1 either before or after the lead wires 5 are fixed to the wafer 8. For use in extremely small electron tubes where minimum space is required, the mount is made with the lead wires 5 loose in the apertures 7 of the wafer so that the lead wires 5 can be moved in the apertures to any desired position before being fixed to the wafer by suitable means. Where the wafer 8 is of ceramic, the walls of the apertures 7 are metallized prior to insertion of the lead wires 5, and the wires are later sealed vacuum-tight to the metallized ceramic by a hard solder or braze.

What is claimed is:

1. A method of making a heater for an electron tube, said method utilizing a pair of jaws each having a V-notch along an outside surface thereof, said method comprising the steps of supporting a heater with two parallel legs thereof positoned in a common first plane, said heater being formed from a fine wire having a bristle insulating coating thereon, supporting side portions of said insulated legs in a second plane normal to said legs and spaced from the ends thereof to prevent movement of said side portions in said first plane, and inserting said pair of jaws between said legs and causing said jaws to move in a circular path forwardly and outwardly for simultaneously bending, centering and scraping the entire length of said leg portions extending beyond said second plane to form bare transverse leg portions in said first plane in a single operation while not removing the insulation from other portions of said heater.

2. The method of making a heater mount for an indirectly heated tubular cathode of an electron tube utilizing a heater having a pair of extending legs, said heater being formed from fine wire and having a brittle insulating coating thereon, said method comprising the steps of supporting a pair of lead wires in spaced parallel relation, forming a transverse notch in the side wall of each of said lead wires intermediate the ends thereof and substantially at right angles thereto, rigidly supporting said heater element with said extending legs in closely spaced apart relation, simultaneously centering, scraping, and bending the entire length of predetermined end portions of the two legs of said insulated heater element to form bare transverse leg portions lying in the plane of said lead wires while not removing the insulation from other portions of said heater, disposing said heater parallel to and between said pair of lead wires and in predetermined longitudinally spaced relation therewith while preserving the rigid supporting of said heater, inserting one of said transverse leg portions in each of said notches, and peening the notched regions of said lead wires to mechanically interlock said heater legs and said lead wires.

3. The method of making a heater mount for an indirectly heated tubular cathode of an electron tube utilizing a heater element having a pair of extending legs, said heater being formed from fine wire and coated with a brittle insulating material, said method comprising the steps of supporting a pair of lead wires in spaced parallel relation, forming a transverse notch in a side wall of each of said lead wires and substantially at right angles thereto, rigidly supporting said heater element with said extending legs in closely spaced apart relation, simultaneously centering, scraping, and bending the entire length of predetermined end portions of the two legs of said insulated heater element to form bare transverse leg portions lying in the plane of said lead wires while not removing the insulation from other portions of said heater, disposing said heater parallel to and between said pair of lead wires while preserving the rigid supporting of said heater, inserting each of said transverse leg portions in each of said notches, and peening the notched regions of said wire to mechanically interlock said heater legs and said lead wires.

4. A method of making a heater for an electron tube, said method utilizing a pair of jaws each having a V-notch along an outside surface thereof, said method comprising the steps of supporting a heater with two parallel legs thereof positioned in a common first plane, said heater being formed from a fine wire having a brittle insulating coating thereon, supporting side portions of said insulated legs in a second plane normal to said legs and spaced from the ends thereof to prevent outward movement of said side portions in said first plane, and inserting said pair of jaws between said legs and causing said jaws to move in a circular path forwardly and outwardly and within said first plane for simultaneously and continuously bending, centering and scraping the entire length of said leg portions extending beyond said second plane to form bare transverse leg portions in said first plane in a single operation while not removing the insulation from other portions of said heater.

References Cited in the file of this patent

UNITED STATES PATENTS

| | | |
|---|---|---|
| 799,156 | Goldberg | Sept. 12, 1905 |
| 1,155,514 | Schmidt | Oct. 5, 1915 |
| 1,379,036 | Moorhead | May 24, 1921 |
| 1,699,805 | Ocko | Jan. 22, 1929 |
| 1,733,294 | Cross | Oct. 29, 1929 |
| 1,733,881 | Illingworth | Oct. 29, 1929 |
| 1,891,482 | Reichhelm | Dec. 20, 1932 |
| 2,162,815 | Krueger | June 2, 1939 |
| 2,287,460 | Wagenhals et al. | June 23, 1942 |
| 2,366,935 | Schmid | Jan. 9, 1945 |
| 2,427,417 | Prickett | Sept. 16, 1947 |
| 2,464,405 | Knauf | Mar. 15, 1949 |
| 2,466,192 | Wood | Apr. 5, 1949 |
| 2,554,126 | Schwartz | May 22, 1951 |
| 2,694,433 | Fulton et al. | Nov. 16, 1954 |
| 2,855,579 | Wintriss | Oct. 7, 1958 |
| 2,953,842 | Holtz et al. | Sept. 27, 1960 |
| 2,954,599 | Cootes et al. | Oct. 4, 1960 |

FOREIGN PATENTS

| | | |
|---|---|---|
| 467,876 | Great Britain | June 24, 1937 |